S. V. DE BOLOTOFF.
MEANS TO RECEIVE STRUT ENDS IN AEROPLANES AND OTHER STRUCTURES.
APPLICATION FILED FEB. 1, 1918.

1,297,331.

Patented Mar. 18, 1919.

Witnesses

Inventor
S. V. De Bolotoff

UNITED STATES PATENT OFFICE.

SERGE VINCENT DE BOLOTOFF, OF LONDON, ENGLAND.

MEANS TO RECEIVE STRUT ENDS IN AEROPLANES AND OTHER STRUCTURES.

1,297,331.

Specification of Letters Patent.

Patented Mar. 18, 1919.

Application filed February 1, 1918. Serial No. 214,866.

*To all whom it may concern:*

Be it known that I, SERGE VINCENT DE BOLOTOFF, a Russian subject, engineer of the Russian Naval Aviation, and whose post-office address is India House, Kingsway, London, England, have invented certain new and useful Improvements in Means to Receive Strut Ends in Aeroplanes and other Structures, of which the following is a specification.

This invention relates to means for receiving strut-ends, and in particular for receiving the ends of the wooden struts commonly employed in aeroplanes.

It is the object of the present invention to provide means for connecting the said members which shall be cheap, light, and easy to assemble, and further which shall preferably not require the struts to be pierced to provide the requisite engagement.

The present invention provides a device to receive and connect strut-ends comprising two angle-plates nested one into the other with their angle-edges parallel to one another but held so that each side in one is spaced from the corresponding side in the other by a gap equal to the thickness of a strut-end, in combination with two tie-pins for each pair of opposed sides thus provided, the said tie-pins being so spaced from one another as to hold a strut-end when inserted in the said gap against displacement along the gap.

Preferably two or more of the said tie-pins are provided each with a tubular sheath, which may be the tubular base of a straining lug, to constitute a distance-piece between the sides of the angle-plates.

In the accompanying drawings—

Figure 1:
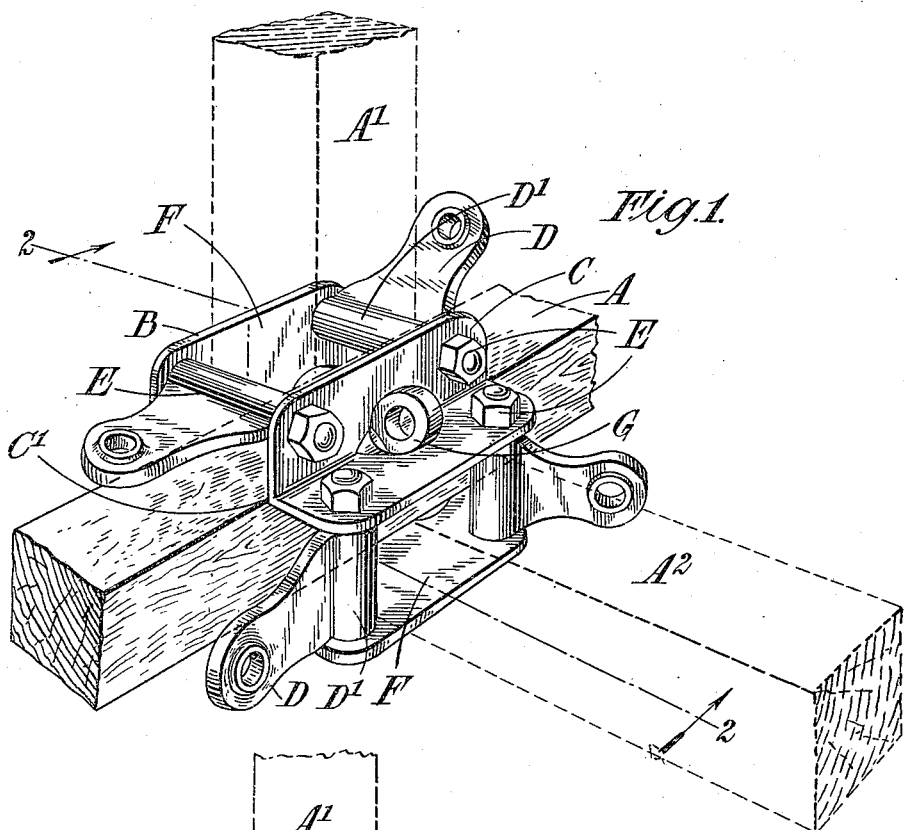
Figure 2:
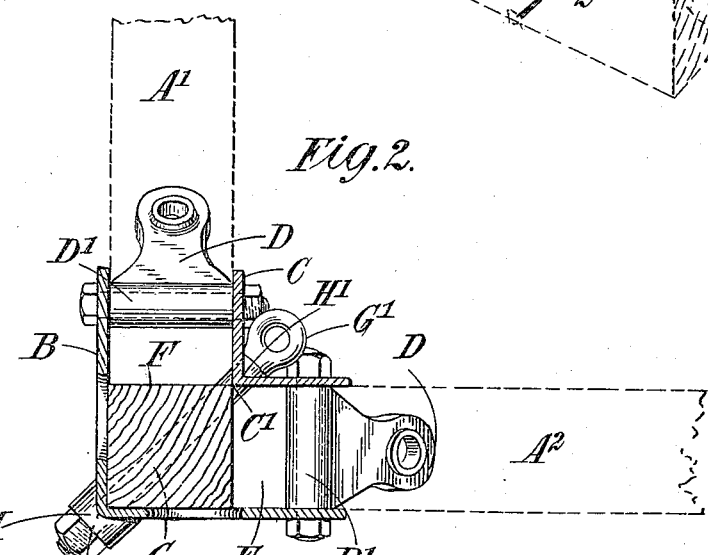

Figure 1 is a perspective view of one form of device embodying this invention, intended for three struts, one strut being shown in position and two others indicated in chain-lines, and Fig. 2 is a section on the line 2—2 of Fig. 1.

The construction illustrated is intended to receive three struts A, $A^1$, $A^2$ of square cross-section and all three of equal cross-section to one another. An outer angle-plate B is held with angle-edge $B^1$ parallel to the angle-edge $C^1$, and its sides parallel to the corresponding sides, of an inner angle-plate C, which has the length of each side about equal to the thickness of a strut.

Four straining lugs D are provided, each formed with a tubular end $D^1$ whose length along the axis of the tube is equal to the thickness of a strut.

The plates B, C are held by four bolts E so that the inner is partly nested in the outer, so leaving gaps F equal to the thickness of a strut. Each bolt passes through two opposed plate-sides and through one of the said tubular ends $D^1$ of a straining lug which is threaded on the bolt between the plate-sides and so serves as a distance-piece for the sides. The bolts form two pairs, each pair connecting two opposed plate-sides, and the two bolts in each pair are so spaced that a strut-end is received between them and is engaged by the tubes $D^1$ upon them against displacement along the gaps F.

In use, the outer plate B is applied to the strut A so that the latter lies in the angle of the plate and the inner plate C is then bolted in position so that the angle-edge $C^1$ rests upon one angular edge of the strut A and holds the strut. The spaces bounded by the bolts and plate-sides then serve to receive the ends of two other struts $A^1$, $A^2$, each at right angles to one another and to the strut A. If desired, a bolt G may be passed diagonally through the first said strut from the angle of the inner plate C to the angle of the outer plate B, and this bolt may have an eye $G^1$ on it so as also to serve as a tie-anchor or straining lug.

A packing-piece H with an internal angular recess and a packing piece $H^1$ with an external angular edge are threaded on the pin G to provide a seating for its nut and head respectively.

The pin G moreover just engages with an edge of each of the struts $A^1$, $A^2$, and such engagement would be of a deeper character if the strut A were absent. In such case the pin G would give additional steadiness to the connection between the struts $A^1$, $A^2$.

It is to be understood that whereas the above described and illustrated construction is one that is intended to receive the ends of struts that are at right angles to one another, this invention is not limited to such cases, for if the angle between the struts $A^1$, $A^2$ be other than a right angle, the device may readily be arranged to receive and connect these ends properly, by correspondingly forming the angles of the plates B and C. Further, the ends of aeroplane-struts sometimes are tapered and in that case the angle of one of the plates is made different from that of the other so as to accommodate the tapering end of the strut, and such a construction will fall within the scope of this invention.

What I claim as my invention and desire to secure by Letters Patent is:—

1. A device to receive and connect strut-ends comprising two angle-plates nested one into the other with their angle-edges parallel to one another but held so that each side in one is spaced from the corresponding side in the other by a gap equal to the thickness of a strut-end, in combination with two tie-pins for each pair of opposed sides thus provided, the said tie-pins being so spaced from one another as to hold a strut-end when inserted in the said gap against displacement along the gap.

2. A device to receive and connect strut-ends comprising two angle plates nested one into the other with their angle edges parallel to one another but held so that each side in one is spaced from the corresponding side in the other by a gap equal to the thickness of a strut-end, in combination with two spaced tie-pins for each pair of opposite sides of the two angle plates, and a bolt passing diagonally from the angle of one plate to the angle of the other, substantially as described.

3. A device to receive and connect strut-ends comprising two angle plates nested one into the other with their angle edges parallel to one another but held so that each side in one is spaced from the corresponding side in the other by a gap equal to the thickness of a strut end, in combination with two spaced tie pins for each pair of opposite sides of the two angle plates, and an eye bolt constituting a tie anchor passing diagonally from the angle of one plate to the angle of the other, substantially as described.

4. A device to receive and connect strut-ends comprising two angle plates nested one into the other with their angle edges parallel to one another, in combination with two spaced tie pins for each pair of opposite sides of the two angle plates, each tie pin carrying a tubular distance piece for spacing each side of the one angle plate from the corresponding side of the other by a gap equal to the thickness of a strut-end, substantially as described.

5. A device to receive and connect strut-ends comprising two angle plates nested one into the other with their angle edges parallel to one another but held so that each side in one is spaced from the corresponding side in the other by a gap equal to the thickness of a strut-end, in combination with two spaced tie pins for each pair of opposite sides of the angle plates, two of said tie pins connecting two opposite sides of the angle plates each carrying a straining-lug having a tubular base constituting a distance piece threaded on the tie pins, substantially as described.

In testimony whereof I affix my signature.

SERGE VINCENT DE BOLOTOFF.

Copies of this patent may be obtained for five cents each, by addressing the "Commissioner of Patents, Washington, D. C."